United States Patent [19]

Vandekeybus

[11] Patent Number: 4,512,287
[45] Date of Patent: Apr. 23, 1985

[54] DEVICE FOR TYING-UP AN ANIMAL

[76] Inventor: Christiaan A. C. Vandekeybus, Kloosterstraat 21, B - 2190 Essen, Belgium

[21] Appl. No.: 451,836

[22] Filed: Dec. 21, 1982

[30] Foreign Application Priority Data

Jan. 4, 1982 [BE] Belgium .................. 2/59531
Apr. 28, 1982 [BE] Belgium .................. 2/59682
Jul. 9, 1982 [BE] Belgium .................. 2/59771

[51] Int. Cl.³ .................................. A01K 1/062
[52] U.S. Cl. ................................. 119/147 R
[58] Field of Search ............... 119/99, 147 R, 147 A, 119/148

[56] References Cited

U.S. PATENT DOCUMENTS 1,449,502  3/1923  Diffendaffer .................. 119/99
1,762,259  6/1930  Currie et al. .................. 119/148
2,847,974  8/1958  Londgren .................. 119/147 X

FOREIGN PATENT DOCUMENTS 2304949   8/1974  Fed. Rep. of Germany ...... 119/147
2317481  10/1974  Fed. Rep. of Germany ...... 119/147

Primary Examiner—Robert P. Swiatek
Attorney, Agent, or Firm—Stevens, Davis, Miller & Mosher

[57] ABSTRACT

A device for tying-up an animal comprises a suspension element and a multipart yoke with two top parts which are hingedly suspended from the suspension element. Each top part comprises a projection. Springs push the end of each projection away from the top part bearing the other projection, thus bringing the top parts in an open position or in a closing position. A lever mounted relative to the suspension element brings the top parts from the closing position to the open position. The lever bears a bolt which in the closing position is present between and against the top ends and which in the open position does not engage the top ends.

10 Claims, 10 Drawing Figures

DEVICE FOR TYING-UP AN ANIMAL

BACKGROUND

This invention relates to a device for tying-up an animal with:

a suspension element, a multipart yoke with two top parts which are hingedly suspended from said suspension element about substantially horizontal and parallel hinge axes, and which project with their top ends above said hinge axes, means which in one end position, retain the top parts in a closing position, and in the other end position, retain said top parts with the top ends thereof directed towards one another in an open position, and a lever mounted relative to the suspension element, which controls said means to bring same from the one end position where they retain the top parts in the closing position, to the other end position where they retain said top parts in the open position.

Such a device is known from DE No. 2,722,730.

In said known device, which is suspended through those means which retain the yoke top parts in the closing position and in the open position, the lever opens the yoke through a quite intricate rods-and-levers set.

The relative position of the rods from said rods-and-levers set insures in the closing position thereof that the animal cannot by itself bring the top parts from the closing position to the open position. Consequently large forces may be exerted on the rods and distort same, in such a way that the further operation of the device becomes unreliable.

THE INVENTION

The invention has for object to provide a device the locking of the yoke top parts of which is operatingly more reliable and is obtained with a simple means. The invention has also for object to provide a device the unlocking of the yoke top parts of which is obtained automatically by means of the single lever which brings the yoke top parts from the closing position to the open position.

For this purpose, the device according to the invention comprises a bolt which in said closing position, is present between and against the top ends, and in said open position, does not engage said top ends, as well as a connexion between the bolt and the lever.

FURTHER BACKGROUND

A device with a bolt which is present in the closing position between the top ends of the top legs of a yoke, is known per se from BE No. 885,292. In said known device, the bolt hinges relative to the tip of a top end of a top part of a yoke leg and is not controlled by a lever which is mounted relative to the suspension element and acts on means which may retain the top parts in the closing position or open position.

The above-mentioned device known from DE No. 2,722,730 and the device known from BE No. 885,292 both have a control member which lies at the very top and has to be pushed upwards for opening the device. Such devices are consequently better used where various devices have to be opened simultaneously by means of an element which runs over the whole stall length at quite a high height, and they are less suitable for being used where each device is to be opened separately at the level of the suspension element at the highest. The device according to the invention to the contrary may have the control lever thereof at the level of the suspension element. Said control lever has to be pulled downwards to open the yoke. The device according to the invention is thus very suitable for an arrangement with discrete opening and may thereby have however a reliable, simple and simple to operate locking.

THE INVENTION

In an advantageous embodiment of the invention, the lever hinges relative to the suspension element about a horizontal axis which lies at right angle to the hinge axes of the top ends relative to the suspension element.

Preferably, said lever passes through a slot which is provided in said suspension element.

Usefully, the bolt is fixedly connected to the lever and said top ends are provided with added stops for the bolt.

The bolt has for example an adjustable projection on either side.

In a particular embodiment of the invention, said lever bears an element which is directed towards said means, which is hinged relative to the lever, and which pushes resiliently the lever away.

DESCRIPTION OF THE PREFERRED EMBODIMENT

Other details and advantages of the invention will stand out from the following description of a device for tying an animal up according to the invention; this description is only given by way of example and does not limit the invention; the reference numerals pertain to the accompanying drawings.

THE DRAWINGS

In the various figures, the same reference numerals pertain to the same elements.

THE DESCRIPTION

Figure 1:
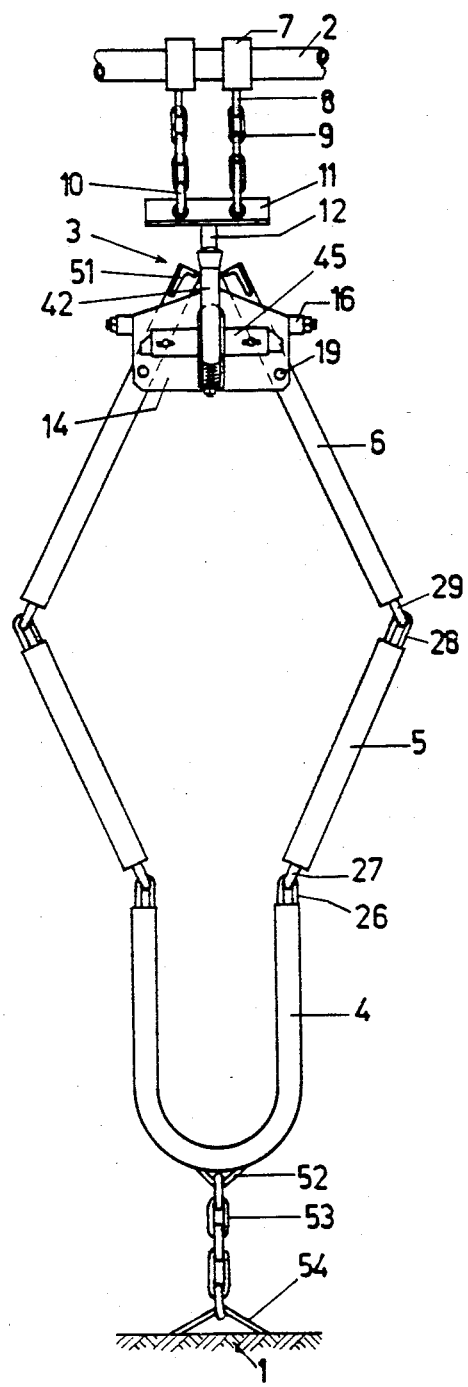
FIG. 1 is a front view of a device for tying an animal up according to the invention, whereby the yoke is shown in open condition.

The device as shown in the figures for tying-up an animal, is mounted inside a fixed structure to which pertain the floor 1 and the upper beam 2.

Said device is intended to hold in position a cow, inside a lying-and-standing station. The cross direction of the lying-and-standing station corresponds to the direction of said beam 2. The lengthwise direction lies at right angles thereto. The animal takes this direction as it enters normally the lying-and-standing station.

The device is comprised mainly of a suspension element 3 and a yoke which is comprised of a bottom yoke 4 and yoke legs connecting thereto. Each yoke leg comprises a bottom part 5 and a top part 6. Said parts 5 and 6 are hingedly connected together as well as to the suspension element 3 and the bottom yoke 4, in a way which is described with further details hereinafter. At rest the parts lie in one and the same plane, the so-called main yoke plane. Independently of whether the device lies in the open condition or in the closed condition, as described hereinafter, the complete device in balance comes to lie in every case with the main yoke plane along a direction which corresponds with the cross-wise direction of the lying-and-standing station.

The station has a crib on the one side of the device extending at rest along the cross-wise direction of the lying-and-standing station; this side is called the front side. The other side of the device is thus called the back.

The suspension element 3 wherein the top parts 6 of the yoke with which the animal is tied-up, are hingedly suspended, is comprised of a front plate 14 and a back plate 15 which extend, in balanced condition, along the cross-wise direction of the standing station, of a top lath 13 which connects on the top side both plates 14 and 15, and of spacers 16 which connect said plates 14 and 15 on either side.

Two rings 7 are provided about the cross-beam 2 to hang the suspension element 3. Each of said rings 7 has at the bottom, an eye 8 wherein is engaged the uppermost link of a chain 9. The lowermost link 10 of each chain 9 is engaged in an opening which is provided in the upright body of a T-iron 11.

Said T-iron 11 thus hangs through two chains 9 from the rings 7 and thus from the cross-beam 2. As the chains 9 are flexible suspension elements, they try under the action of the weight of T-iron 11 and everything that hangs therefrom, to take a position wherein the center lines thereof lie in parallel relationship together. At rest said center lines define a vertical plane which extends in parallel relationship with the upper beam 2, that is along the cross-wise direction of said lying-and-standing station.

It will appear from the following description that the top parts 6 of the yoke also extend in a vertical cross plane when said T-iron 11 extends in such a plane.

Under the influence of the animal, the yoke and thus the yoke parts 6 and T-iron 11 are moved away from the cross plane but as soon as the gravity force can act freely, the yoke will return to the cross plane.

Said T-iron 11 forms a fixed unit with the rod 12 and the upper lath 13 of the suspension element which is welded to said rod. An eye 52 which is provided on the bottom of said bottom yoke 4, is connected through a chain 53 to an eye 54 which is set in the floor 1 of the fixed structure. The device is thus mounted between the upper beam 2 and the floor 1 by means of chains 9 and 53.

Figure 2:
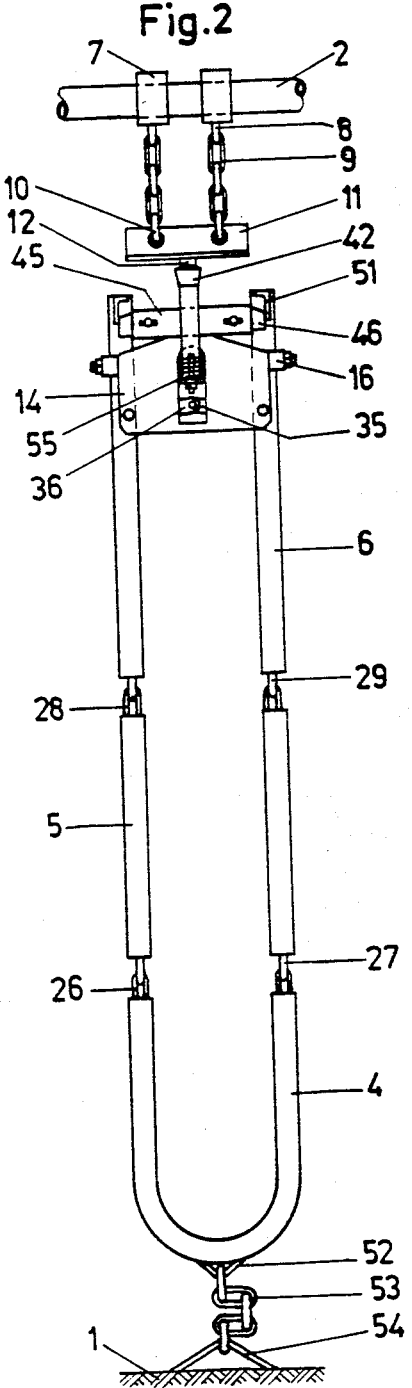
FIG. 2 is a front view of the device as shown in FIG. 1, whereby the yoke is shown in closed position.

When the device takes the closing position as shown in FIG. 2, chain 53 hangs slack which makes it possible for the animal to move within some limits. When it is desired to limit such movement possibilities, it is possible to join directly at the top links of chains 9 which are not adjacent links, for example by means of a usual hook, which decreases the play in the suspension.

When the device takes the open position as shown in FIG. 1, said chains 9 and 53 are tightened, in such a way that the movement possibilities of the open device are to be neglected.

The spacers 16 are U-shaped parts the legs 17 of which connect to facing surfaces of said plates 14 and 15 and the bases 18 of which define the spacing between the front plate 14 and back plate 15. The legs 17 thus lie in parallel relationship with the main yoke plane and the bases 18 thus stand at right angles to that plane. By main yoke plane is meant that cross plane of the lying-and-standing station wherein lie notably the yoke parts 5 and 6 and the bottom yoke 4 when the device hangs in balance in the position as shown in FIGS. 1 and 2.

Through said front plate 14 and back plate 15 run two screw-bolts 19 which stand at right angles to said plates and connect with the head 20 thereof to the front side of front plate 14. On the back, on each bolt 19 is screwed a nut 21 which presses against the back of back plate 15. A tube 22 lies about each bolt 19 between plates 14 and 15. Said tubes 22 lie in openings which are provided in the tube-shaped top parts 6 and they are welded to said top parts 6. The screw-bolts 19 thus form parallel hinge axes for the top parts 6 and in the rest condition of the device, said hinge axes are substantially horizontal. The top ends of said top parts 6 project above said hinge axes 19, which always lie at right angles to the main yoke plane.

Figure 3:
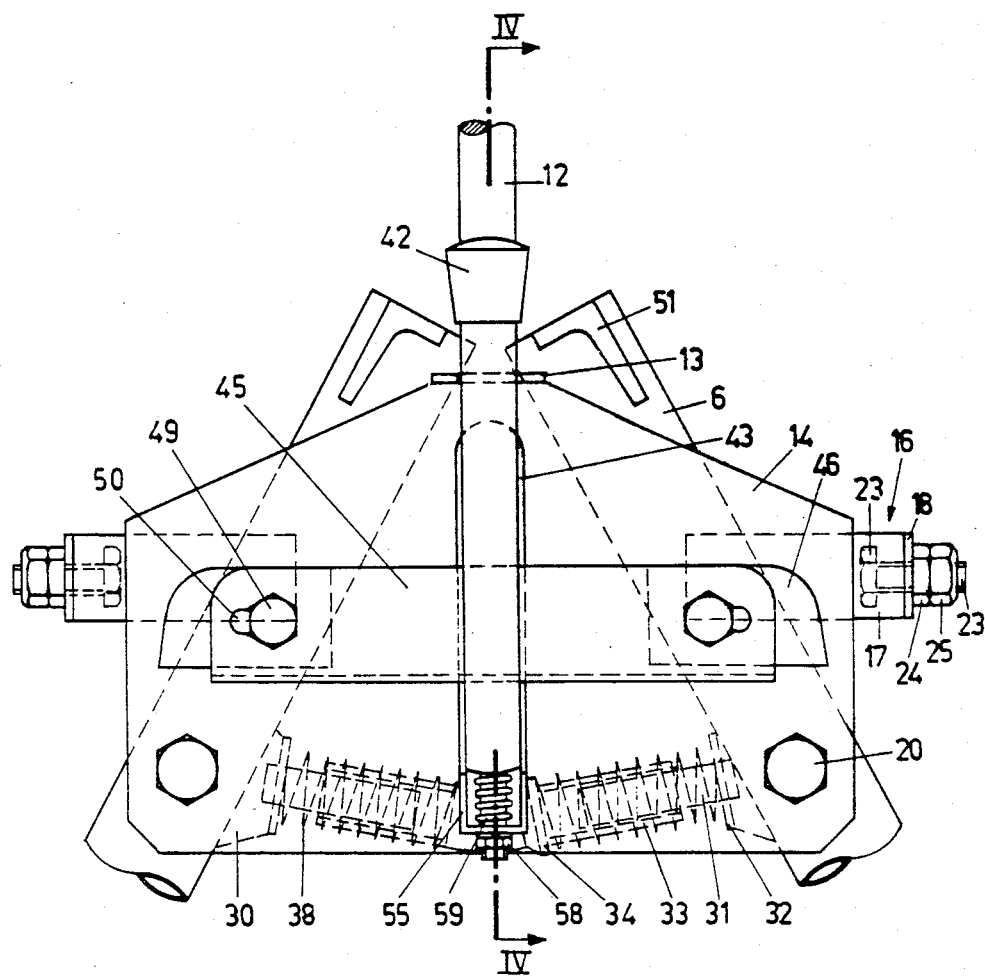
FIG. 3 shows on a larger scale, part of the device shown in FIG. 1.
Figure 5:
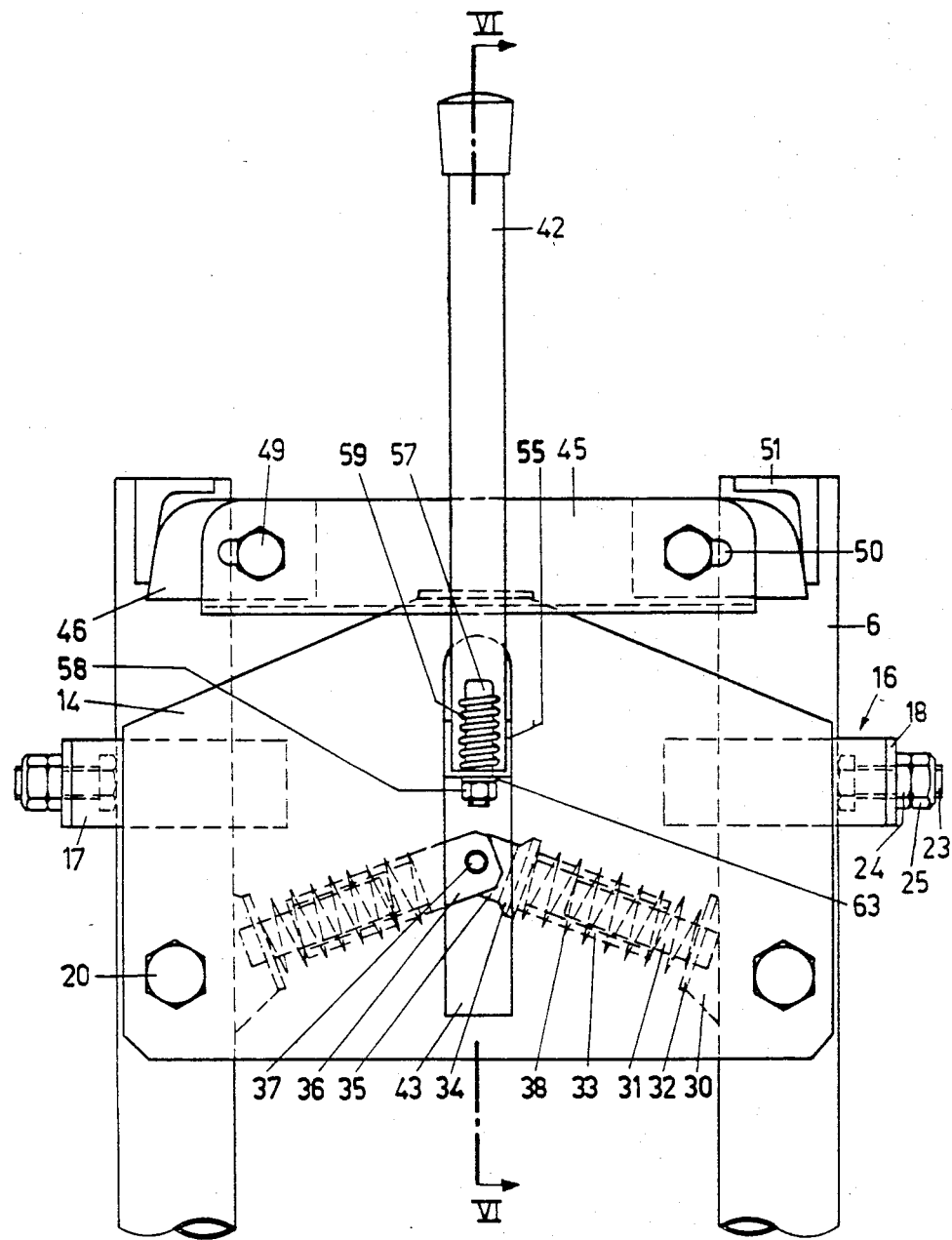
FIG. 5 shows on the scale of FIGS. 3 and 4, part of the device as shown in FIG. 2.

The top parts 6 may take relative to the suspension element 3, two end positions, namely the open position as shown in FIGS. 1 and 3, and the closing position as shown in FIGS. 2 and 5.

The open position is reached when the top parts 6 engage during the opening, with the top ends thereof, said rod 12. The closing position is reached when the top parts 6 engage during the closing, the adjustment bolts 23.

In the base-forming portion 18 of each spacer 16 is provided an opening opposite which a nut 24 is welded on the outer side. A screw-bolt 23 which bears with the head thereof on the inner side, passes through said opening, is screwed into the nut 24, and is retained in position by a check nut 25.

In the closing position as shown in FIGS. 2 and 5, the top parts 6 lie substantially in parallel relationship with one another, but as the mutual position of said top parts 6 in the closing position is dependent on the adjustment of the adjusting bolts 23, such parallel relationship is not absolutely accurate, but quite enough for the suitable operation of the device.

The adjustment of the adjusting bolts 23 is particularly used to adapt the available spacing between the yoke legs in closing position, to the width of the thickest portion of the neck of the animal to be tied-up.

As it appears mostly from FIG. 5, in the closing position the top parts 6 come closer to one another above the hinge axes 19 and spread away from one another below said hinge axes 19 when the adjusting bolts 23 are so adjusted as to bring the heads thereof closer to one another. The standing animal has the thickest neck portion level with the bottom parts 5 or with the lowermost portions of the top parts 6 of the yoke legs. The spacing between said parts in the closing position should thus be adapted to the width of the thickest portion of the animal neck.

The spacing between the bottom parts 5 is dependent on the one hand on the position of the top parts 6 in the rest position, which position may be adjusted with the adjusting bolts 23, and on the other hand on the spacing between the legs of the bottom yoke 4. To obtain different values for said latter spacing, it is possible to use replaceable bottom yokes.

It is clear that one adjusts in the same way the spacing between the top parts 6 at the level where the thickest portion of the animal neck is present.

The directions as mentioned hereinbelow of the various eyes which connect together the yoke parts, pertain to the above-defined balance position of the main yoke plane and to the closing position of the device.

At the bottom ends thereof, said top parts 6 of the yoke legs bear eyes 29 which lie in parallel relationship with the lengthwise symmetry plane of the lying-and-standing station.

In said eyes 29 are engaged the eyes 28 of the top ends of the yoke bottom parts 5. The eyes 28 lie in parallel relationship with the vertical cross plane of the lying-and-standing station.

On the bottom ends thereof said bottom parts 5 of the yoke legs bear eyes 27 which lie in parallel relationship with the lengthwise symmetry plane of the lying-and-standing station.

In said eyes 27 are engaged the eyes 26 of the ends of the legs of the bottom yoke 4. The eyes 26 lie in parallel relationship with the vertical cross plane of the lying-and-standing station.

The eyes 26 and 27, and the eyes 28 and 29 form universal hinges which allow hinging motions of a top part 6 relative to a bottom part 5, and of a bottom part 5 relative to the bottom yoke, as well in the main yoke plane as outside said plane.

Each top part 6 bears approximately level with the hinge axis 19 thereof, a multi-part projection with a varying length. Said projections form one and the same fixed angle relative to that top part they belong to.

Each projection is mainly comprised of a fixed pin 31 and a tube 33 which is alternately slidable over said pin 31. The pin 31 is secured on the top part 6 through material 30 which defines the angle between pin 31 and top part 6. The one tube 33 bears on that end thereof removed from the top part 6, a collar 34 and beyond said collar 34, an extension 35. The other tube 33 bears on that end thereof removed from the top part 6, a fork 36. Between the fork legs lies said extension 35. A small shaft 37 in parallel relationship with the hinge axes 19, passes through said extension 35 and the legs of said fork 36, and forms consequently a hinge axis for both tubes 33 and thus for the projections said tubes belong to. At the level of the connecting material 30, each pin bears a fixed ring 32. About each tube 33 lies a spring 38. Said springs 38 press on the one hand against a ring 32 and on the other hand against the collar 34, and respectively against the fork 36. The spring 38 thus presses one projection of the tube 33 (the collar 34 or the fork 36) away from the projection of the pin 31 (the ring 32).

Figure 7:
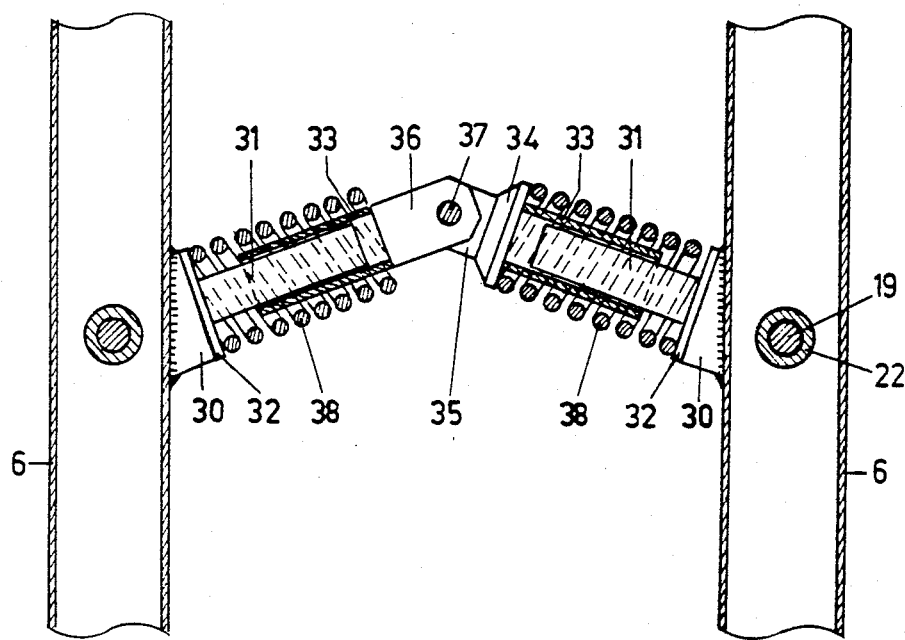
FIG. 7 shows a cross-section along line VII—VII in FIG. 6.
Figure 8:
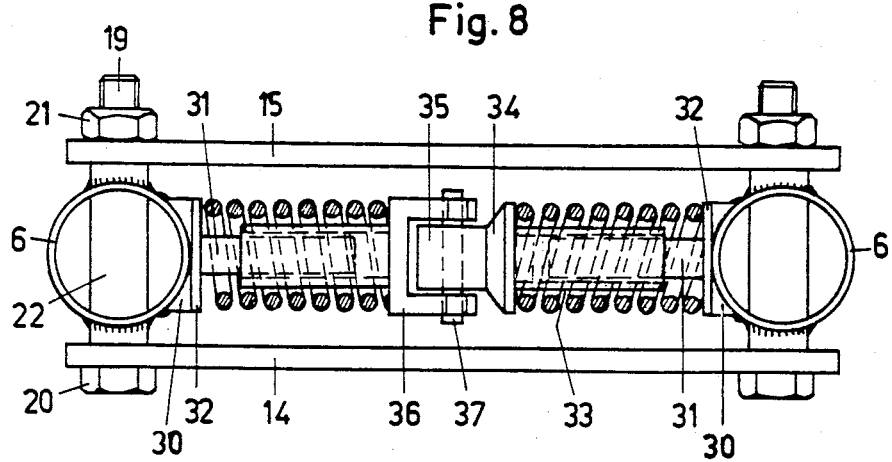
FIG. 8 is a top view of the device shown in FIG. 7.

In the closing position as shown in FIGS. 2 and 5, which is also the position as shown in FIG. 7, the small shaft 37 lies higher than the hinge axes 19. The springs 38 then try to push the top ends of the top parts 6 further away from one another, but this is prevented due to said top parts 6 then engaging the heads of said adjusting bolts 23.

In the open position as shown in FIGS. 1 and 3, the small shaft 37 lies lower than the hinge axes 19. The springs 38 then try to bring the top ends of said top parts closer to one another, but this is prevented due to said top parts engaging with the top ends thereof, the rod 12.

The back plate 15 bears on the back thereof two lugs 39 wherein openings are provided for a small shaft 41.

About said shaft 41 is hinged a lever 42 and an element 55 which has a U-shaped cross-section wherein the lever 42 can fit. The lever 42 bears therefor a part 56 wherein is mounted a tube 40 which lies about said small shaft 41. The handle part of said lever 42 is on the front side of the device. Through the bottom of said element 55 with a U-shaped cross-section, passes a threaded rod 57 which is fastened to the lower surface of lever 42. About said rod 57 lies a small spring 59 which presses the lever 42 away from element 55 until said element 55 engages a small nut 58 which is screwed on rod 57 below said element 55. A washer 63 lies between nut 58 and element 55.

Figure 6:
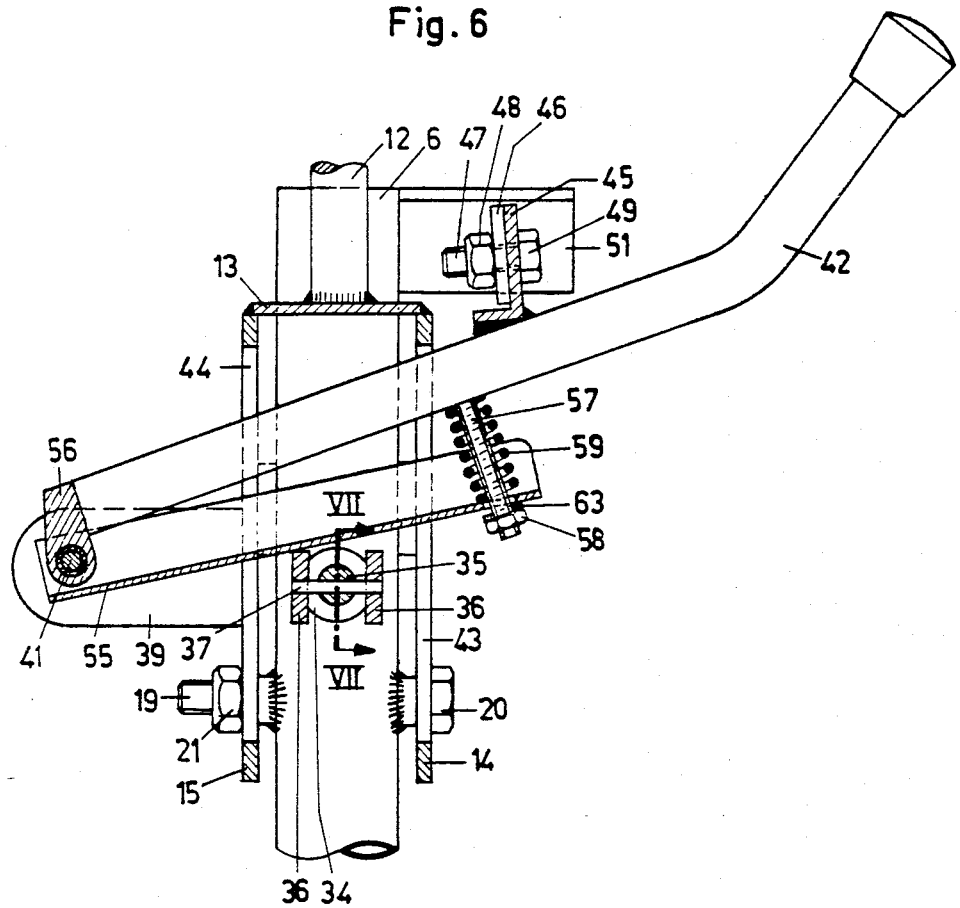
FIG. 6 shows a cross-section along line VI—VI in FIG. 5.

Normally said element 55 thus lies some distance away from lever 42, as shown in FIG. 6. When the lever 42 is now pulled downwards and the element 55 engages thereby said fork 36, the lever 42 will first be pulled into element 55 against the action of spring 59, before said lever 42 pushes away fork 36 through said element 55.

The lever 42 passes through a slot 43 which is provided in front plate 14, and through a slot 44 which is provided in back plate 15. Said lever 42 is thus operated from the front side, that is the side the crib lies on.

The lever 42 and element 55 lie above the small shaft 37, and it is thus possible by means of lever 42, through element 55, to push fork 36, just as fork 36 can bring upwards lever 42 and element 55.

The lever 42 which extends in a plane at right angles to the main yoke plane and comprising the vertical symmetry axis of the yoke, bears a cross-wise spacer member 45 with two slidable portions 46.

The spacer member 45 is of L-shape and the flat slidable portions 46 are clamped against the upright side of said L-shaped part 45 by means of screw-bolts 47 and nuts 48. The screw-bolts 47 press thereby with the heads 49 thereof on the spacer member 45, while the nuts 48 press on said portions 46. The screw-bolts 47 pass through oblong slots 50 which are provided in spacer member 45, in such a way that the portions 46 are adjustable relative to spacer member 45 and the adjustment thereof may compensate for wear and manufacturing tolerances, as well as make possible an adapting to the required yoke width in closing position, thus an adapting corresponding to the one obtained by adjustment of the screw-bolts 23.

Said portions 46 have slanting edges which engage, in the closing position, corresponding edges of stops 51 which are fast to the top parts 6. Said stops 51 are L-shaped in a cross-section along the main yoke plane. Said edges of both stops 51 form an acute angle which opens downwards.

Figure 4:
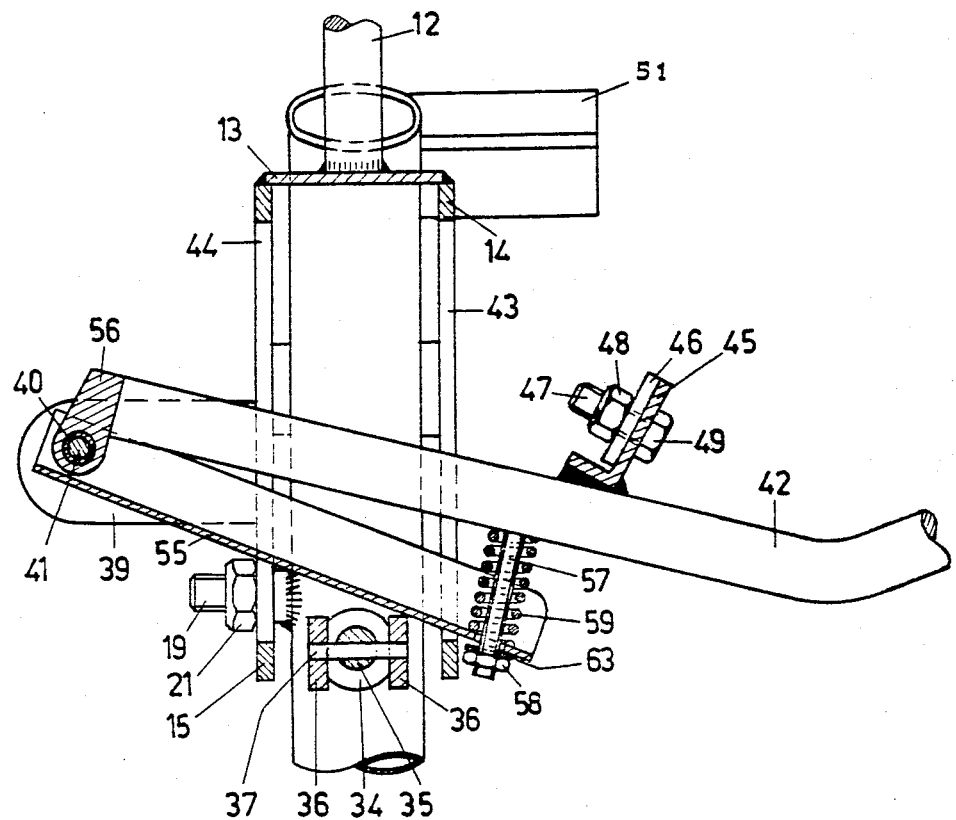
FIG. 4 shows a cross-section along line IV—IV in FIG. 3.

As it appears mainly from FIGS. 1,3 and 4, the lever 42 takes the lowermost position thereof when the yoke is open. The yoke is opened when those portions of top parts 6 which lie below the hinge axes 19 are spread away from one another and when the top ends of said top parts 6 engage the rod 12. The bottom parts 5 of the yoke legs are then also spread away from one another, the bottom yoke 4 is raised to the most, and the chain 53 is tightened.

The animal which enters the lying-and-standing station moves to the feed in the crib, and presses thereby with its shoulder against the yoke bottom parts 5. The yoke is thereby pushed towards the crib at the level of said bottom parts 5, and as the chain 53 is already tightened, the movement of said bottom parts 5 towards the crib is but possible when the spacing between axes 19 on the one hand, and the eyes 27 on the other hand is increased. The bottom parts 5 have thus to come closer to one another, and those portions of top parts 6 which lie below the hinge axes 19, also have to come closer to one another. This latter movement results in the pins 31 which are directed downwards in the open position of the yoke, being brought upwards, whereby the springs 38 are compressed until the pins 31 have reached the horizontal position thereof. As soon as the pins 31 lie somewhat above the horizontal position thereof, the springs 38 can again expand, which expansion of said springs 38 helps in turn to bring closer together those portions of top parts 6 which lie below the hinge axes 19, and consequently also to bring closer together the bottom parts 5 of the yoke legs.

The transition from the open position of the yoke legs to the closing position thereof which is started by the animal, against the action of said springs 38, is thus pursued due to the action of said springs in such a way that the yoke legs reach the closing position as shown in FIGS. 2,5 and 6.

The element 55 is thereby raised by fork 36 and thus also brings lever 42 upwards from the position in FIG. 4 to the position as shown in FIG. 6, which brings the spacer member 45 between said stops 51, whereby said portions 46 of the spacer member 45 engage said stops 51. The device is thus locked in the closing position, in such a way that the animal cannot bring by itself the device from the closing position to the open position.

To bring the yoke from the closing position as shown in FIGS. 2,5 and 6 to the open position as shown in FIGS. 1,3 and 4, the lever 42 is pulled downwards. The spacer member 45 then moves away with the adjustable portions 46 thereof from between the stops 51 on the top ends of the top parts 6 of the yoke legs. The yoke is thus unlocked. With such unlocking, the element 55 remains at rest on fork 36. The lever 42 enters element 55 against the action of spring 59, but the spring power before being completely compressed, is not strong enough to transmit the lowering motion of lever 42 to fork 36.

After lever 42 has been brought downwards enough to bring on the one hand spacer member 45 below said stops 51, and to compress completely said spring 59, said lever 42 also presses enough through element 55, on fork 36. The composite projections the pins 31 are part of, are thereby pushed downwards against the action of said springs 38. Those portions of top parts 6 which lie above the hinge axes 19 are thus brought closer together, and those portions of said top parts 6 which lie below the hinge axes are moved away from one another, which brings also the bottom parts 5 of the yoke legs away from one another, and thus brings the yoke in the open position thereof. As soon as the small shaft 37 lies lower than the hinge axes 19, the springs 38 which have first been compressed, help to open the yoke.

The unlocking and opening are thus caused one after the other by one and the same lever. The lever 42 is indeed connected on the one hand to the spacer member 45, but also acts on the other hand on those means comprised of pins 31 and the parts connected thereto, which in the one end position thereof retain the top parts 6 of the yoke legs in a closing position, and in another end position thereof retain said top parts 6 with the top ends thereof facing one another, in an open position.

Figure 9:
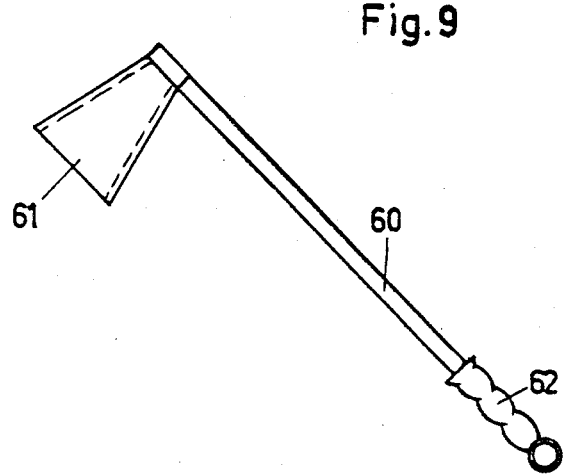
FIG. 9 is a side view of an operating member which is usable in combination with the device as shown in the preceding figures.
Figure 10:
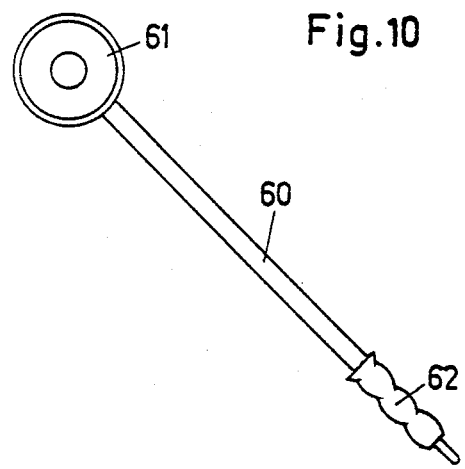
FIG. 10 is a bottom view of the operating member of FIG. 9.

Some persons find it unpleasant or even dangerous to come too near the animals as they have to open the device by pushing the lever 42. The lever can also be remotely controlled through a loose operating member shown in FIGS. 9 and 10. Said operating member has a handle 60 which bears on the one end thereof a handgrip 62 and on the other end a funnel 61. With the handgrip 62 in the hand, it is possible to bring the funnel 61 over the lever and thus to operate the lever 42 without having to come too near.

The invention is in no way limited to the above-described embodiment and within the scope of the invention, many changes may be brought to the described embodiment, notably as regards the shape, the composition, the arrangement and the number of the components which are used to embody the invention.

I claim:

1. A device for tying-up an animal comprising:
a suspension element,
two parallel and substantially horizontal bolts supported by the suspension element,
a multiple yoke comprising top parts which are pivotally mounted on said bolts, said top parts having top ends which project above the said bolts, said top parts pivoting between a closing position and an open position and having in the closing position the top ends remote from each other and in the open position the top ends close to each other,
means comprising a spring which acts on both top parts and which in the closing position is in a first position and in the open position is in a second position, said means thus retaining the top parts in the closing position when said spring is in its first position and retaining the top parts in the open position when said spring is in its second position,
lever mounted relative to the suspension element, said lever controlling said means to bring said spring from its first position to its second position, thus bringing the top parts from the closed position to the open position, and
a spacer member movable between a first position and a second position and which in its first position is present between and against said top ends of said top parts and which in its second position does not engage said top ends of said top parts, said spacer member being mounted on said lever.

2. A device for tying-up an animal comprising:
a suspension element,
two parallel and substantially horizontal bolts supported by said suspension element,
a multiple yoke comprising top parts which are pivotally mounted on said bolts, said top parts having top ends which project above said bolts, said top parts pivoting between a closing and an open position and having in the closing position the top ends remote from each other and in the open position the top ends close to each other,
means comprising a spring which acts on both top parts and which in the closing position is present above said bolts and in the open position is present below said bolts, said means retaining said top parts in the closing position when said spring is present above said bolts and retaining the top parts in the open position when said spring is present below said bolts, and
a projection on one of said top parts, said projection facing the other of said top parts,
a lever mounted relative to the suspension element pressing said projection and thus controlling said means to bring said spring from above said bolts to below said bolts, thus bringing the top parts from the closing position to the open position, and a spacer member movable between a first position and a second position and which in its first position is present between and against said top ends of said top parts and which in its second position does not engage said top ends of said top parts, said spacer member being connected to said lever.

3. The device of claim 2 wherein said means include a projection on the other top part having an end remote from the top part, said projections facing one another and having the remote ends below the bolts in the open position and above the bolts in the closing position, said spring pushing the end of one projection away from the top part bearing the other projection, said lever engaging an upper side of at least one of said projections.

4. The device of claim 2, wherein said means comprise a projection on each of said top parts, each projection comprised of a pin which is secured to the top part, a tube slidable on the pin, a projection on the tube, and a radial projection on the pin said spring surrounding said tube and pushing the radial projection of the pin away form the projection of the tube so that the projection has a varying length, the tubes of the projections of the top parts being hingedly connected, the lever engaging the upper part of a projection of a tube.

5. The device of claim 2, wherein said suspension element bears a horizontal shaft which lies at right angle to said bolts and a slot, said lever pivoting about said shaft and passing through said slot.

6. The device of claim 2, in which the suspension element bears a horizontal shaft which lies at right angle to said hinge axes and a slot, said lever pivoting about said shaft and, through said slot, said spacer member being fixedly connected to the lever.

7. The device of claim 2, in which the lever bears an element facing said means, which element hinges relative to the lever and pushes the lever resiliently away.

8. The device of claim 2, including an element with a U-shaped cross-section pivotal relative to the lever, said lever fittable in the open portion of said U-shaped cross-sectional element, the closed portion of said U-shaped cross-sectional element facing said means, and a spring to push the lever resiliently away from said cross-sectioned element.

9. The device of claim 2, in which said means comprise a projection on each top part having an end remote from the top part, said projections facing one another and having the remote ends below the bolts in the open position and above the bolts in the closing position, said spring pushing the end of one projection away from the top part bearing the other projection, an element with a U-shaped cross-section pivotal relative to the lever, said lever fittable in the open portion of said U-shaped cross-sectional element, the closed portion of said U-shaped cross-sectional element engagable with the upper side of a projection and a spring pushing the lever resiliently away from said element.

10. The device of claim 2, wherein the spacer member supports adjustable portions, each top part is provided with an added stop engaging one of said adjustable portions when the top parts are in their closing position, said suspension element having two adjustable elements, said adjustable elements of the suspension element facing one another and each of them engaging a top part when said top parts are in their closing position.

* * * * *